United States Patent
Dillenberger et al.

(10) Patent No.: US 6,470,406 B1
(45) Date of Patent: Oct. 22, 2002

(54) MANAGING ISOCHRONOUS PROCESSES IN A HETEROGENOUS WORK ENVIRONMENT

(75) Inventors: Donna Dillenberger, Yorktown Heights; Stephen Heisig, Tarrytown, both of NY (US); Ingolf Salm, Gaufelden; Robert Vaupel, Rottenburg, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/340,281

(22) Filed: Jun. 25, 1999

(51) Int. Cl.[7] .............................................. G06F 13/14
(52) U.S. Cl. ...................... 710/200; 710/260; 709/226; 709/207; 709/104; 709/100; 379/255
(58) Field of Search ................................. 710/200, 260; 709/100, 226, 207, 109, 104; 379/268, 255

(56) References Cited

U.S. PATENT DOCUMENTS

| | | | | | |
|---|---|---|---|---|---|
| 5,428,789 | A | * | 6/1995 | Waldron III | 709/103 |
| 5,473,773 | A | * | 12/1995 | Aman et al. | 709/104 |
| 5,574,934 | A | * | 11/1996 | Mirashrafi et al. | 709/207 |
| 6,018,785 | A | * | 1/2000 | Wenniger | 710/200 |
| 6,055,619 | A | * | 4/2000 | North et al. | 712/36 |
| 6,226,377 | B1 | * | 5/2001 | Donaghue, Jr. | 379/265 |
| 6,230,183 | B1 | * | 5/2001 | Yocom et al. | 709/105 |
| 6,272,544 | B1 | * | 8/2001 | Mullen | 709/226 |
| 6,282,560 | B1 | * | 8/2001 | Eilert et al. | 709/100 |

* cited by examiner

*Primary Examiner*—Jeffrey Gaffin
*Assistant Examiner*—Abdelmoniem Elamin
(74) *Attorney, Agent, or Firm*—Ohlandt, Greeley, Ruggiero & Perle, L.L.P.; Daniel P. Morris (57) ABSTRACT

In a heterogeneuos work environment a method and apparatus for managing isochronous streaming servers is disclosed. This includes a mechanism for allocating processor resource to streaming servers at admission control time with respect to the business importance of work they will be running. This mechanism includes a provision to preempt currently running streaming work of lesser business importance in order to allocate its share of the processor to the new higher importance work. Also included is a mechanism to resume the server when a running stream terminated and processor becomes available. In the case of the variable bit rate multiple peak problem a mechanism is presented to preempt running streaming work at the lowest business importance so that higher priority work can continue to run unaffected. The mechanism to resume paused streams at the termination of a stream also restarts this work. In this way streaming work is never degraded so as to become unintelligible due to processor constraints but either runs correctly or is paused/terminated. Also presented is a method of combining a queuing model, admission control, process management and preemption/resumption services to allow a generic streaming service or isochronous process to be integrated into a heterogeneous work environment on a particular platform.

27 Claims, 4 Drawing Sheets

MANAGING ISOCHRONOUS PROCESSES IN A HETEROGENOUS WORK ENVIRONMENT

BACKGROUND OF THE INVENTION

1. Field of the Invention

The present invention relates to managing isochronous work, such as data streaming on a computer system concurrently with other types of work and, in particular, allocating processor resource to the streaming work according to its business importance.

2. Description of Related Art

Isochronous data streaming work (for example, streaming audio or video) has unique processor requirements. In order to provide a smooth and uninterrupted flow of data to the client, data streaming work requires both timely and sufficient access to the processor resource per unit of time. This requirement does not exist for traditional types of non-streaming work, such as interactive, transactional, and batch.

There are several approaches currently taken to guarantee this access. In the dedicated machine approach, a particular computer system runs only streaming work. As the capacity of the machine is known to the streaming server, it will only start as many streams as the processor is capable of running. This is not an economical way to run streaming work since it requires more dedicated machines to run more streams and does not allow other work to run on unused or under used machines.

In the high dispatch priority approach, streaming work is given a high dispatching priority to insure access to the processor whenever it is ready to execute. This results in the possibility of streaming work dominating other types of work since there is no way to reserve capacity for other work or restrict the amount of processor that the streaming work will consume.

In the high dispatch priority with admission control approach, the system administrator for streaming work reserves a certain amount of processor capacity. Streaming units of work are started if the admission control algorithm determines that they could run in the available remaining capacity. There are several methods for extrapolating whether a streaming unit of work will fit in the remaining capacity. Some methods use a constant to relate a bit rate to an amount of processor resource. Other methods use a calibration technique where streaming units of work of various bit rates are monitored with their processor consumption being recorded at initialization. Still other methods calculate a bit rate/processor consumption ratio based on current observed usage.

A method for performing admission control in a manner that limits the amount of processor resource consumed by a group of work units is described in U.S. patent application Ser. No. 08/829,538, filed Mar. 28, 1997 now U.S. Pat. No. 6, 282, 560 in the name of C. K. Eilert et al. for "Managing processor Resources In A Non-Dedicated Computer System". This patent does not address how to handle requests that fail admission control for reason of exceeding the limit amount of allocated processor resource.

Another complication arises when the bit stream has a variable rate. There are two possibilities for assigning processor resource for a data stream with a variable bit rate, namely, a peak value or an average value. If the more conservative peak value is used, the total assigned processor capacity will not be exceeded by the case where multiple streams achieve their peak bit rate at the same time. However, a streaming unit of work will not be started if its peak bit rate will cause the total assigned-processor capacity to be exceeded even though there is sufficient processor resource available. If the average bit rate value is used for allocation of processor resource, it is possible that multiple streaming units of work achieving a peak rate simultaneously will exceed the total assigned amount of processor resource.

There are disadvantages to the peak value and average value approaches. First, When the peak value approach is used, a stream that could actually run may not be started. This leads to decreased parallelism. Second, all the streaming units of work are capped by the calculated limits such that they all run in a degraded fashion. For streaming work, running in a degraded fashion is unacceptable since if the isochronous rate is not met the video will contain artifacts and the audio will drop out or be unintelligible.

Thus, the aforementioned approaches have drawbacks that either degrade the quality of streaming work or decrease parallelism of streaming work. In such approaches, all streaming work has been treated equally. What is needed is an approach that minimizes degradation of streaming work and delay of non-streaming work.

Another aspect of managing streaming work is minimizing the startup latency that occurs when a new copy of the stream server has to be initialized at the time a streaming request is received. There are several methods for dealing with the startup latency problem that all suffer various drawbacks. Some methods instantiate a new copy of the stream server as necessary, thereby conserving storage, but incurring a startup time for every streaming request. Other methods that run a maximum number of streams start the requisite number of stream processes in advance of any request. These stream processes remain initialized, thereby consuming storage regardless of whether streaming work is currently active. This storage is consumed even if there is pressure for storage on the machine from other work, thereby resulting in an inefficient use of the storage and processor resources of the machine. Still other methods use a single copy of code to process several streams rather than a separate copy for each. This approach suffers from a susceptibility to code failure that will result in all streams terminating.

The classification of traditional types of work according to a relative importance based on rules specified by the system administrator is described in U.S. Pat. No. 5,473,773 to J. D. Aman et al., entitled "Apparatus and Method for Managing a Data processing System Workload According to Two or More Distinct processing Goals".

Thus, a method is needed that allows a system administrator to define a specific capacity of processor resource for streaming work and to allocate that processor resource to streaming work based on such capacity with the remaining capacity of the machine being reserved and available for other types of work.

There is also a need for a management process that relieves storage pressure on behalf of other types of work so as to allow for more efficient use of processor and storage.

Lastly, since isochronous applications may be ported from one platform to another it is not often the case that the admission control or process model from one platform is appropriate for porting to another platform. Since the application has isochronous goals it is advantageous to provide a framework of existing services to achieve these goals rather than forcing each new application to modify or reinvent a scheme to meet these goals.

SUMMARY OF THE INVENTION

An object of the present invention is to provide a method of allocating computer resources to isochronous streaming work according to its business importance relative to other types of work as well as other streaming.

Disadvantages of the prior art approaches are overcome according to the present invention by a method that manages streaming work based on business importance. A system administrator defines the amount of processor resource that is available for allocation to streaming work. New streaming work is admitted if there is processor resource available or if there is currently running streaming work that has a lower business importance than the new streaming work. That is, the lower business importance work is preempted to provide processor resource for the higher priority streaming work.

A further object of the present invention is to allow a system administrator a choice for the preemption action of either pausing or terminating the currently running streaming work. In a related aspect of the present invention, preempted work is resumed when processor resource becomes available if the preemption action was pause.

In a further aspect of the present invention, streaming work is monitored to make sure it does not consume more processor resource than a defined amount that has been assigned by the system administrator. In the event streaming work actually consumes more than its estimated amount of processor resource, individual streaming units of work will be preempted based on business importance until the processor resource consumed by all streaming work is less than the defined amount. The preempted work will be resumed when processor resource later becomes available.

According to a further feature of the present invention, storage consumption by stream servers is avoided when there is currently no streaming work and storage is needed by other work on the system that has a higher business importance than the streaming work. Incoming requests for streaming units of work are placed on a queue served by a workload manager which starts new stream server processes on demand since code in the stream server side of the queue performs admission control. The workload manager then shuts down initialized, waiting stream server processes if it detects that storage is needed by work with a higher business importance.

A still further aspect of the present invention is to provide the framework of the existing queuing mechanism, admission control, preemption and resumption services, security environment initialization, as well as the process management mechanism so that a generic isochronous process can be managed.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

The present invention is directed to a computer system which is capable of running several different types of work concurrently (a heterogeneous environment) in which one type is isochronous (referred to hereafter as data streaming) work.

Figure 1:
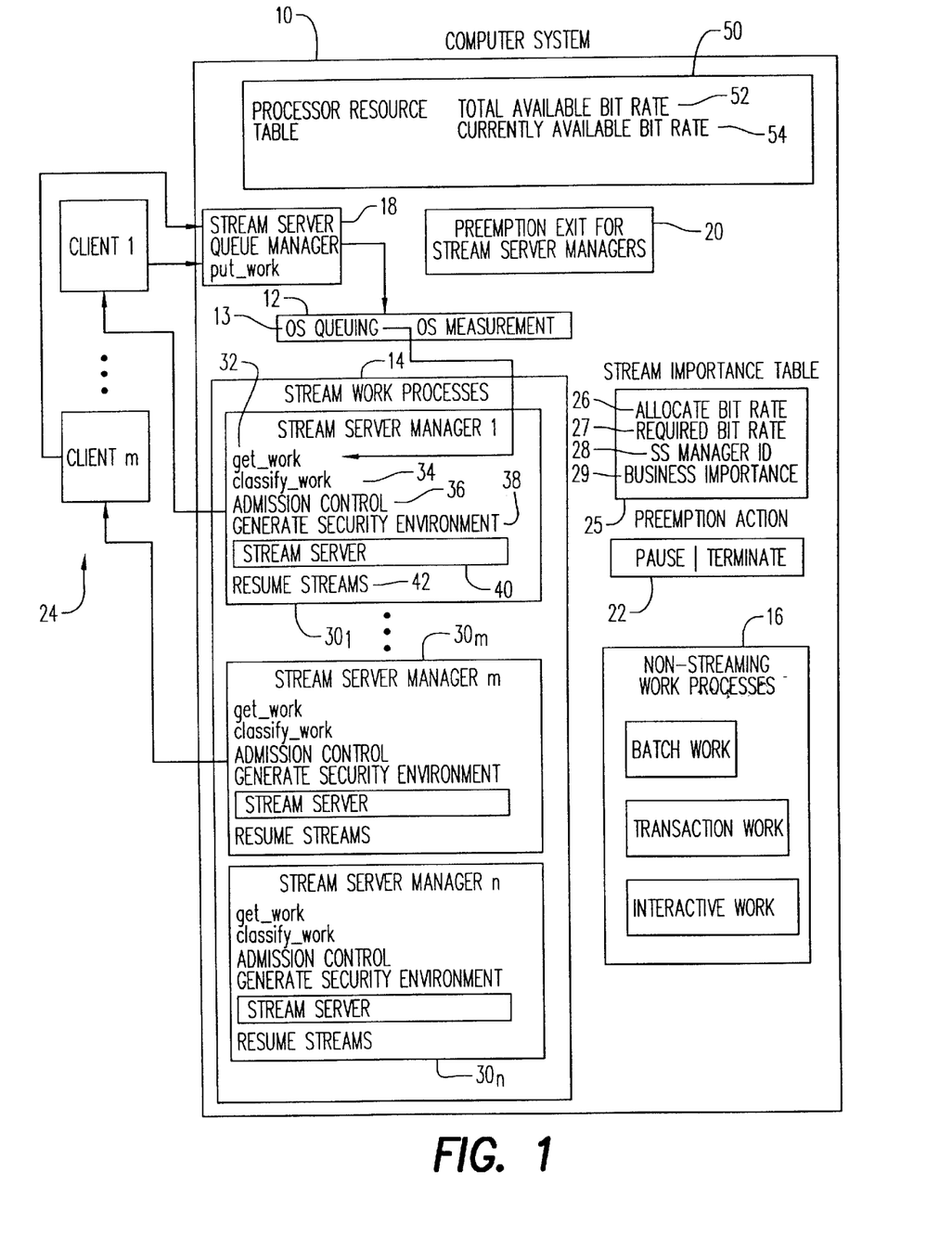
FIG. 1 shows a computer system with streaming servers as well as other types of work running concurrently.

Referring to FIG. 1, an exemplary computer system 10 includes an operating system 12, such as the IBM OS/390 operating system. However, the invention is not limited to this particular platform and other operating systems may be used.

Computer system 10 also includes streaming work processes 14 for processing streaming work and non-streaming work processes 16 for processing non-streaming work. Computer system 10 receives requests for streaming units of work, such as video or audio recordings from a plurality of clients 24, designated as client 1 through client m. To handle these requests and serve the requested streaming work, computer system 10 further includes a stream server queue manager 18, a preemption exit procedure 20 and a preemption action indicator 22, as well as streaming work processes 14.

Clients 24 send streaming work requests to computer system 10 by connecting to stream server queue manager 18 via any suitable communications protocol, such as TCp/Ip. Operating system 12 includes an OS queuing service 13 and an OS measurement service 11. OS queuing service 13 is used by stream server manager 18 to place a received work request on a queue using put_work service included in operating system 12. OS measurement service is used by computer system 10 in a manner to be described below in connection with FIG. 5.

There may be a single stream server queue manager 18 that queues work requests to the correct queue or there may be a plurality of stream server queue managers listening on separate ports in the case where a plurality of different kinds of stream servers are running. Each kind of stream server will be incapable of performing work requests for other types so a separate queue is required for each type of streaming work.

Streaming work processes 14 include a plurality of stream server managers $30_1$ through $30_n$. Stream server managers $30_1$ through $30_n$ are substantially identical, except as hereafter noted. For this reason, only stream server manager $30_1$ will be described in detail.

Stream server manager 30 includes a get_work hook 32, a classify_work hook 34, an admission control 36, a generate security environment 38, a stream server 40 and a resume stream 42. Get_work hook 32 uses OS queuing services 13 to obtain work requests from stream server manager 18.

Generate security environment 38 affords security of a client's communications, applications and data. For example, security environment 38 may be a security program that is imported from one of the clients 24.

Stream server 40 may be any suitable stream server that is capable of providing a stream of data in real time for a video or audio. As there are different video and/or audio protocols, the stream servers for one or more of stream server managers $30_1$ through $3_n$ may be dedicated to the different protocols.

Resume stream 42 is a feature of the present invention that resumes a streaming unit of work that has been preempted.

Classify work 34 may be any suitable process that classifies work based on a specification determined by a system administrator of computer system 10. For example, classify work 34 may be the work classification system described in the aforementioned Aman et al. patent. According to the present invention, the specification is defined according to business importance of the streaming work as described hereafter.

Admission control 36 may be any suitable admission control that uses an assigned total allocated processor resource capability for all streaming work and a processor resource consumption amount for each requested streaming unit of work to manage requests from clients 24 for units of work. For example, admission control 36 may be the admission control described in the aforementioned Eilert et al. application, but modified with hooks to run with the preemption features provided by the present invention and described hereafter.

For admission control purposes, computer system 10 includes a stream importance table 25 and a processor resource table 50. Stream importance table 25 includes entries for a plurality of allocated bit rates 26, a required bit rate 27, an SS (stream server) manager id 28 and a business importance 29. Allocated bit rates 26 are the bit rates allocated to units of streaming work that are running. Required bit rate 37 is the bit rate of a paused unit of work. SS manager id 28 identifies the stream server manager $30_1$ through $30_m$ that was running a paused unit of work. Business importance 29 may use any suitable priority rating scheme. For example, it may simply be a rating 1, 2, 3, and so on.

processor resource table 50 includes a total available bit rate 52 and a currently available bit rate 54. Bit rate is one example of a measure of processor resource. Total available bit rate 52 is the total amount of processor resource defined by the system administrator available to be allocated to streaming work. Currently available processor resource 54 is the difference between the total available bit rate and the sum total of the unit allocated bit rates of all units of streaming work that are currently running.

According to the present invention, preemptive action indicator 22, preemptive exit procedure 20, admission control 36, stream importance table 26 and processor resource table 50 are used for the process that manages streaming work in computer system 10 preemptive action indicator 22 gives the system administrator the option to define whether a preempted unit of work is to be paused or terminated. When preemptive action indicator 22 is set to pause, a preempted unit of work will be resumed under the control of resume streams 42. If preemptive action indicator 22 is set to terminate, a preempted stream will have to be requested again at a later time.

Admission control 36 is used where a new request is rejected due to an insufficient amount of currently available bit rate 54. In this case, preemption can occur only if there is one or more currently running units of work that have a lower business importance than that of the requested work unit. The newly requested work unit will run only if the allocated bit rates of the lower business importance work units afford enough currently available bit rate 54 for the newly requested unit of work to be run.

Business importance 29 of a request for a work unit is assigned by classify_work 34 based on a specification of business importance priority defined by the system administrator. For example, business importance 29 may be assigned based on who the requesting client is and the nature of the work unit being requested. This specification is entered into the computer and used by classify work 34 to assign a business importance 29 to each request.

Figure 2:
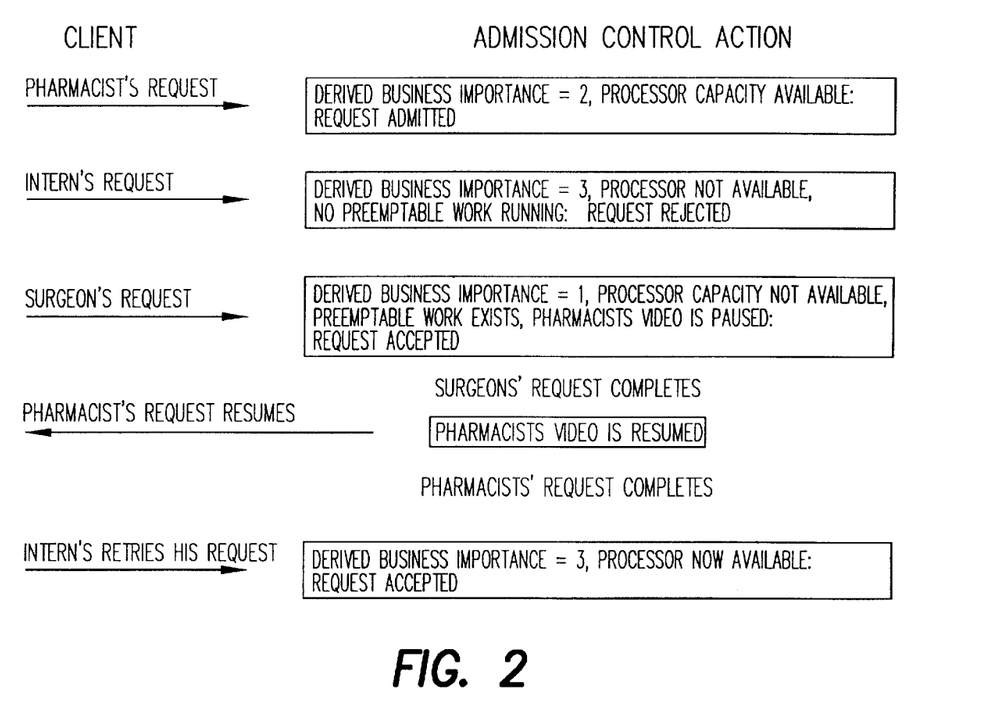
FIG. 2 depicts an example of admission control of the FIG. 1 system.

Referring to FIG. 2, an example of admission control action is depicted. In this example, a given is that the currently available bit rate will allow only one video to be streamed. A pharmacist requests a training video concerning drug interactions with a business importance of 2. The request is admitted and the training video is started. While the training video is running, an intern requests a video of a laproscopic procedure with a business importance of 3. The request is denied because there is no preemptable work running. Still while the training video is running, a surgeon who is in an operating room with a patient on the operating table requests a surgical planning video that is based on scan data from the patient. This request has a business importance of 1 and is accepted. The pharmacist's training video is preempted with a pause.

When the surgeon's video completes, the pharmacist's video is resumed and completes. The intern later submits his request. The currently available bit rate is sufficient and the request is accepted.

preemptive exit procedure 20 is used when units of work that are concurrently running exceed the total available bit rate 52. For this case, one or more lower business importance units of work are preempted to allow other currently running units of work to be streamed without degraded performance. As streaming tasks are completed, currently available bit rate 54 increases. When it becomes high enough, a preempted unit of work is resumed.

Figure 3:
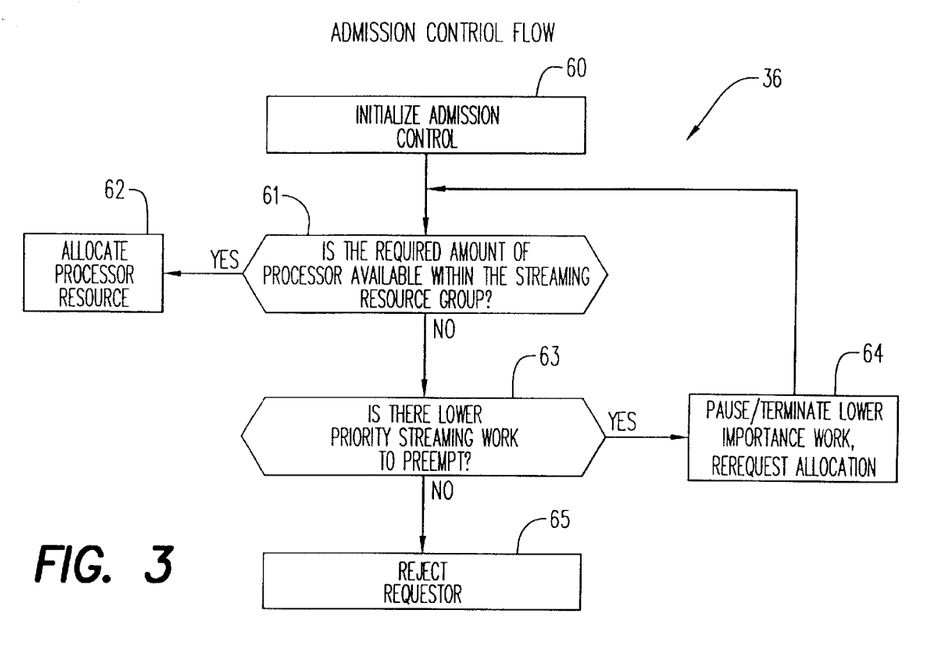
FIG. 3 shows admission control logic with respect to the business importance of streaming work.

Referring to FIG. 3, admission control 36 begins when a new request for a unit of work is obtained by one of the stream server managers $30_1$ through $30_m$. Step 60 initializes admission control 36 with processes that are known. Step 61 then determines if the required amount of processor resource is available for the newly requested unit of work. That is, step 61 compares the currently available bit rate 54 with the allocated bit rate 26 of the newly requested unit of work. If enough processor resource is available, step 62 allocates processor resource and the newly requested work is run.

If step 61 determines that there is not enough processor resource available to run the newly requested work, step 63 makes a search of stream importance table 25 to find lower importance work unit to preempt. If a streaming server that is currently running at a lower business importance is found, it will be paused or terminated via a signal or some other inter-process communication mechanism. Its entry in stream importance table 25 will be updated to reflect its paused status and the paused work unit's allocated bit rate is decremented from currently available bit rate 54. The method now returns to step 61 for a retry. Steps 61, 63 and 64 are repeated until either adequate processor resource is made available or there is no lower importance work unit to preempt. If step 63 eventually finds enough processor resource to run the newly requested work, it is run. If step 63 ultimately finds that there is no more lower importance work unit to preempt and that there is not adequate processor resource to run the newly requested unit of work, the request is rejected. The requester must try later.

If preemptive action 22 is set to terminate, the preempted work is terminated and will have to be requested again later. If preemptive action 22 is set to pause, the unit of work will be resumed later by resume streams 42.

Figure 4:
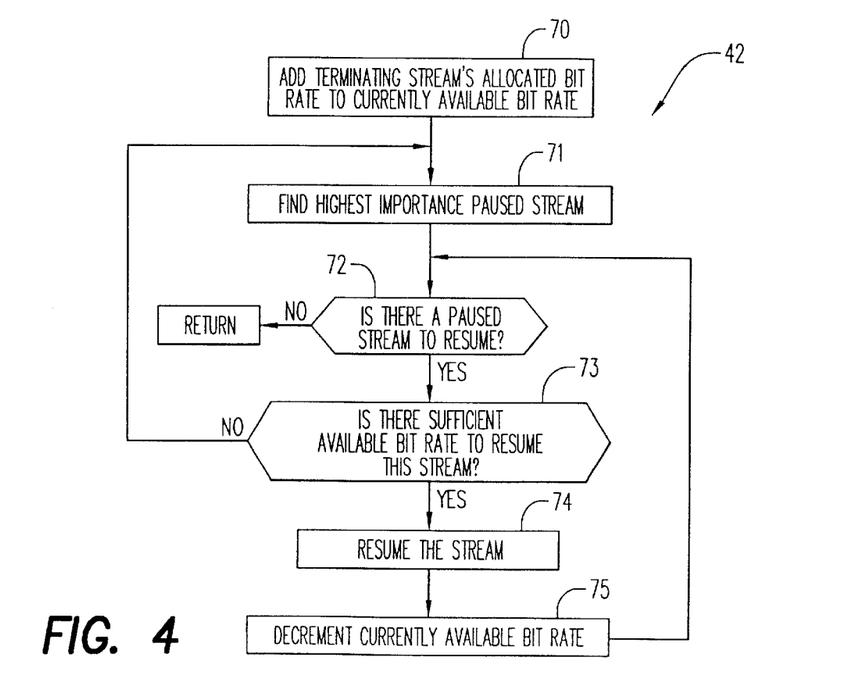
FIG. 4 shows the preemption action flow for streaming work resumption after pause.

Referring to FIG. 4, when a running stream terminates, resume streams 42 is initiated for paused streams (units of work) when a running stream is completed. Resume streams 42 begins with step 70 by adding the terminating stream's allocated bit rate to currently available bit rate 54. Step 71 finds the highest importance paused stream by searching the stream server manager ids 28 in stream importance table 25. Step 72 determines if step 71 located any paused streams to resume. If not, resume streams 42 ends.

If a paused stream is located, step 73 determines if there is adequate processor resource to resume this paused stream. That is, this paused stream's allocated bit rate is compared to currently available bit rate 54. If not, steps 71, 72 and 73 are repeated for other paused streams. If currently available bit rate 54 is adequate to run a paused stream, this paused stream is resumed by step 74. Step 75 decrements currently available bit rate 54. Steps 72 and 73 are then repeated for other paused streams until step 72 determines that there are no more paused streams to resume. When this happens, step 72 ends resume streams 42.

Figure 5:
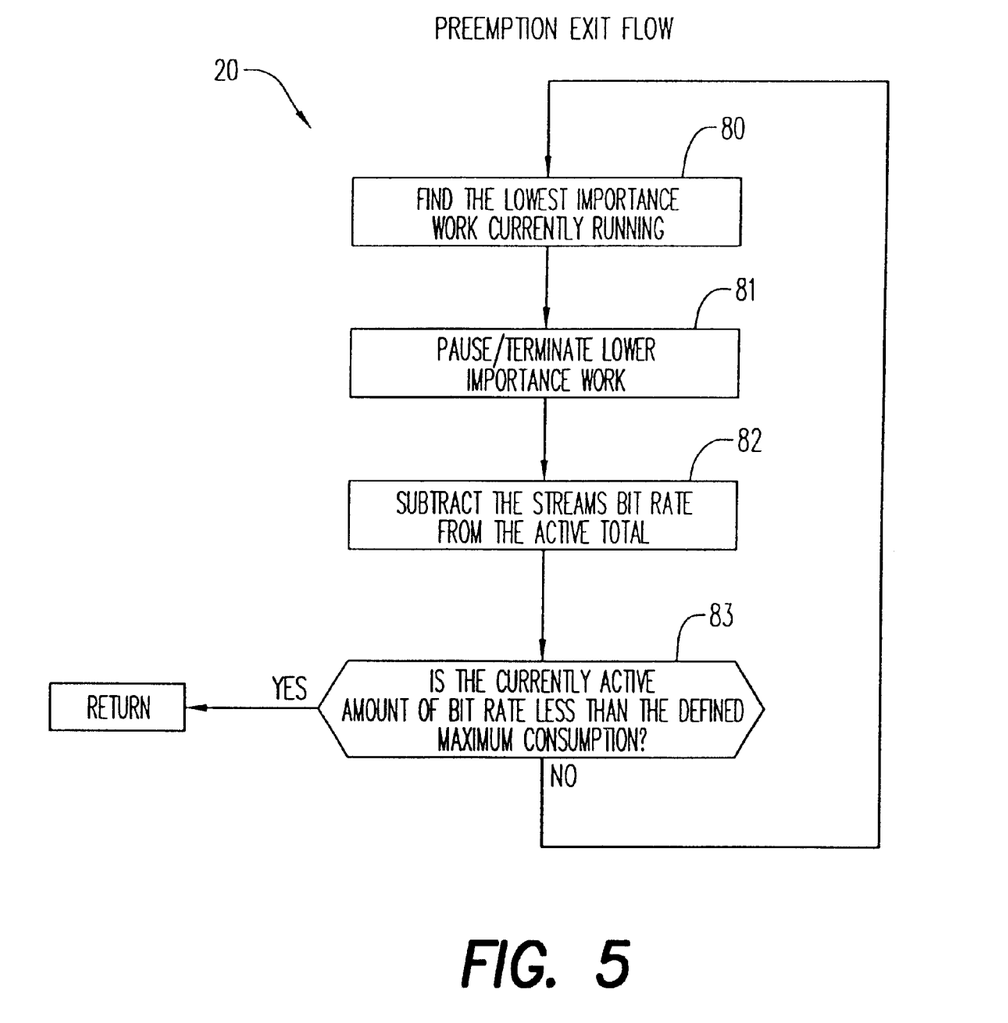
FIG. 5 shows the preemption exit flow.

Referring to FIG. 5, preemption exit 20 begins when total available bit rate 52 (total processor resource assigned to streaming work) is exceeded by a measured processor consumption by all running streaming work. This processor consumption is measured by OS measurement service 11 of operating system 12 (FIG. 1). exceed total available bit rate 52. When this happens, preemption exit 20 operates to preempt lower business importance running streams to manage total actual bit rate to a value less than total available bit rate 52.

Preemption exit 20 begins with step 80 by finding the lowest importance work that is currently running. This work is paused/terminated. Step 82 subtracts this paused stream's allocated bit rate from currently available bit rate 54. Step 83 determines if currently available bit rate 54 is less than the defined maximum consumption. If not, steps 80 through 83 are repeated (more running work units are paused/terminated) until step 83 determines that the defined maximum consumption is not exceeded. When this happens, preemption exit 20 is ended. Paused streams are later resumed as running streams terminate by resume streams 42 as shown in FIG. 4 and described above.

While the invention has been particularly shown and described with respect to illustrative and preferred embodiments thereof, it will be understood by those skilled in the art that changes in form and details may be made therein without departing from the spirit and scope of the invention which should be limited only by the scope of the appended claims.

What is claimed is:

1. A method of managing streaming work in a computer system that runs both streaming work and non-streaming work, said method comprising;

assigning a business importance priority to a plurality of streaming work units according to at least two levels of priority;

assigning a preemptive action to each of said plurality of streaming work units;

running one or more of said plurality of streaming work units; and preempting, in accordance with said assigned preemptive action, at least one of said running streaming work units that has a first level of said priority with another of said plurality of streaming work units that has a second priority level higher than said first level.

2. The method of claim 1, wherein said assigned preemptive action is selected from the group of (1) pausing said preempted work unit and later resuming the running of said preempted work unit, and (2) terminating said preempted work unit.

3. The method of claim 2, further comprising:

maintaining a currently available processor resource amount for said streaming work;

allocating an allocated processor resource amount to each of said plurality of streaming work units;

decrementing said currently available processor resource amount with the allocated processor amount for said at least one streaming work unit; and wherein said streaming work unit with said second priority level is run only if said currently available processor resource amount exceeds the allocated processor amount for said second priority level work unit.

4. The method of claim 3, wherein running one or more of said plurality of streaming work units includes concurrently running two or more of said plurality of streaming work units, and wherein preempting at least one of said running streaming work units includes preempting as many of said streaming work units that are running as needed for said currently available processor resource amount to exceed the allocated processor resource amount of said streaming work unit with said second priority level.

5. The method of claim 1, further comprising:

maintaining a measure of the actual processor resource consumed by said plurality of streaming work units; and if said measure exceeds a total processor resource amount assigned to all of said streaming work, preempting, in accordance with said assigned preemptive action, a first one of said running streaming work units that has a lower level of said priority with another of said plurality of streaming work units that has a higher priority level.

6. The method of claim 5, wherein said assigned preemptive action is selected from the group of (1) pausing said preempted work unit and later resuming the running of the preempted work unit, and (2) terminating said preempted work unit.

7. A method of managing streaming work in a computer system that runs both streaming work and non-streaming work, said method comprising;

assigning a business importance priority to a plurality of streaming work units according to at least two levels of priority;

running two or more of said plurality of streaming work units;

maintaining a measure of the actual processor resource consumed by said two or more streaming work units being run; and if said measure exceeds a total processor resource amount assigned to all of said streaming work, preempting a first one of said two or more running streaming work units that has a low level of said priority with another of said plurality of streaming work units that has a higher priority level.

8. The method of claim 7, further comprising pausing any work units that are preempted.

9. The method of claim 8, further comprising resuming the running of a work unit that has been paused when a currently available processor resource amount exceeds an allocated processor resource amount of said work unit paused.

10. A memory medium for a computer system that runs both streaming work and non-streaming work, said memory medium comprising:

means for controlling said computer system to assign a business importance priority to a plurality of streaming work units according to at least two levels of priority;

means for controlling said computer system to assign a preemptive action to each of said plurality of streaming work units;

means for controlling said computer system to run one or more of said plurality of streaming work units; and means for controlling said computer system to preempt, in accordance with said assigned preemptive action at least one of said running streaming work units that has a first level of said priority with another of said plurality of streaming work units that has a second higher priority level.

11. The memory medium of claim 10, wherein said assigned preemptive action is selected from the group of (1) pausing said preempted work unit and later resuming the running of said preempted work unit; and (2) terminating said preempted work unit.

12. The memory medium of claim 11, further comprising:

means for controlling said computer system to maintain a currently available processor resource amount for said streaming work;

means for controlling said computer system to allocate an allocated processor resource amount to each of said plurality of streaming work units;

means for controlling said computer system to decrement said currently available processor resource amount with the allocated processor amount for said at least one streaming work unit; and wherein said streaming work unit with said second priority level is run only if said currently available processor resource amount exceeds the allocated processor amount for said second priority level work unit.

13. The memory medium of claim 12, wherein said means for controlling said computer system to run concurrently runs two or more of said plurality of streaming work units; and wherein said means for controlling said computer system to preempt preempts as many of said streaming work units that are running as needed for said currently available processor resource amount to exceed the allocated processor resource amount of said streaming work unit with said second priority level.

14. The memory medium of claim 13, further comprising:

means for controlling said computer system to maintain a measure of the actual processor resource consumed by said plurality of streaming work units; and means for controlling said computer system if said measure exceeds a total processor resource amount assigned to all of said streaming work, to preempt, in accordance with said assigned preemptive action, a first one of said running streaming work units that has a lower level of said priority with another of said plurality of streaming work units that has a higher priority level.

15. The memory medium of claim 14, wherein said assigned preemptive action is selected from the group of (1) pausing said preempted work unit with a lower level of priority and later resuming the running of said preempted work unit with a lower level of priority and, (2) terminating said preempted work unit.

16. A memory medium for a computer system that runs both streaming work and non-streaming work, said memory medium comprising:

means for controlling said computer system to assign a business importance priority to a plurality of streaming work units according to at least two levels of priority;

means for controlling said computer system to run one or more of said plurality of streaming work units;

means for controlling said computer system to maintain a measure of the actual processor resource consumed by said two or more running streaming work units; and means for controlling said computer system if said measure exceeds a total processor resource amount assigned to all of said streaming work, to preempt a first one of said two or-more running streaming work units that has a low level of said priority with another of said plurality of streaming work units that has a higher priority level.

17. The memory medium of claim 16, further comprising:

means for controlling said computer system to pausing any of said preempted work units.

18. The memory medium of claim 17, further comprising:

means for controlling said computer system to resume the running of one of said work units that have been preempted and paused when a currently available processor resource amount exceeds an allocated processor resource amount of said one of the paused work units.

19. A streaming manager for a computer system that runs streaming work and non-streaming work, said streaming manager comprising:

one or more programs that perform:

assigning a business importance priority to a plurality of streaming work units according to at least two levels of priority;

assigning a preemptive action to each of said plurality of streaming work units;

running one or more of said plurality of streaming work units; and preempting, in accordance with said assigned preemptive action, at least one of said running streaming work units that has a first level of said priority with another of said plurality of streaming work units that has a second priority level higher than said first level.

20. The streaming manager of claim 19, wherein said assigned preemptive action is selected from the group of (1) pausing said preempted work unit and later resuming the running of said preempted work unit, and (2) terminating said preempted work unit.

21. The stream server manager of claim 20, wherein said one or more programs further perform:

maintaining a currently available processor resource amount for said streaming work;

allocating an allocated processor resource amount to each of said plurality of streaming work units;

decrementing said currently available processor resource amount with the allocated processor amount for said at least one streaming work unit; and wherein said streaming work unit with said second priority level is run only if said currently available processor resource amount exceeds the allocated processor amount for said second priority level work unit.

22. The stream server manager of claim 21, wherein running one or more of said plurality of streaming work units includes concurrently running two or more of said plurality of streaming work units; and wherein preempting at least one of said running streaming work units includes preempting as many of said streaming work units that are running as needed for said currently available processor resource amount to exceed the allocated processor resource amount of said streaming work unit with said second priority level.

23. A streaming manager for a computer system that runs streaming work and non-streaming work, said streaming manager comprising:

one or more programs that perform:

assigning a business importance priority to a plurality of streaming work units according to at least two levels of priority;

running one or more of said plurality of streaming work units;

maintaining a measure of the actual processor resource consumed by said two or more streaming work units being run; and if said measure exceeds a total processor resource amount assigned to all of said streaming work, preempting a first one of said two or more running streaming work units that has a low level of said priority with another of said plurality of streaming work units that has a higher priority level.

24. The stream server manager of claim 23, wherein said one or more programs further performs pausing any work units that are preempted.

25. The stream server manager of claim 24, wherein said one or more programs further performs resuming the running of a work unit that has been paused when a currently available processor resource amount exceeds an allocated processor resource amount of said work unit paused.

26. The stream server manager of claim 21, further comprising initializing a client provided security environment procedure in said computer system.

27. The stream server manager of claim 22, wherein a plurality of stream servers are initialized to concurrently run said two or more of said plurality of streaming work units, and wherein an unused one of said stream servers is shut down when not needed, whereby additional storage is made available for use in said computer system.

* * * * *